US011242697B2

United States Patent
Southon

(10) Patent No.: US 11,242,697 B2
(45) Date of Patent: Feb. 8, 2022

(54) ROAD FREIGHT TRANSPORT SECURITY SYSTEM

(71) Applicant: AET Int Ltd, Eastbourne (GB)

(72) Inventor: Barry Southon, Eastbourne (GB)

(73) Assignee: AET INT LTD, Eastbourne (GB)

( * ) Notice: Subject to any disclaimer, the term of this patent is extended or adjusted under 35 U.S.C. 154(b) by 0 days.

(21) Appl. No.: 16/699,389

(22) Filed: Nov. 29, 2019

(65) Prior Publication Data
US 2020/0173193 A1 Jun. 4, 2020

(30) Foreign Application Priority Data
Nov. 29, 2018 (GB) ...................................... 1819407

(51) Int. Cl.
*E05B 39/00* (2006.01)
*E05B 83/14* (2014.01)
(Continued)

(52) U.S. Cl.
CPC .......... *E05B 39/005* (2013.01); *E05B 67/383* (2013.01); *E05B 83/14* (2013.01);
(Continued)

(58) Field of Classification Search
CPC ...... E05B 39/005; E05B 83/14; E05B 67/383; E05B 83/10; G06Q 50/28; G06Q 10/0832;
(Continued)

(56) References Cited

U.S. PATENT DOCUMENTS

| 2007/0192117 A1* | 8/2007 | Alvarez | G06Q 10/0833 705/332 |
| 2007/0255152 A1* | 11/2007 | Park | A61B 5/30 600/513 |

(Continued)

FOREIGN PATENT DOCUMENTS

| WO | WO-0245998 A2 * | 6/2002 | ............. G01S 7/527 |
| WO | WO-2011066494 A2 * | 6/2011 | ............ F16G 11/106 |

*Primary Examiner* — Brian Wilson
(74) *Attorney, Agent, or Firm* — Muncy, Geissler, Old & Lowe, P.C.

(57) ABSTRACT

A road freight transport security system for a vehicle, is described, which comprises a database; and a portable electronic device running a security application. The security application is configured to prompt a user to carry out a plurality of external security checks of the vehicle, provide a facility for the user to confirm completion of those checks, provide a facility for the user to associate one or more photographs, taken by the portable electronic device, with one or more of the checks, and to upload log data to the database, the log data indicating at least a date and time of completion of the checks. A sensor device is also provided, mounted within a freight area of the vehicle, having one or more sensors, and being operable to communicate an alert to the portable electronic device in the event that an anomaly is detected inside the freight area. In this way, real time detection of security breaches within a freight trailer or container may be achieved. The driver is not required to engage directly with an intruder, and is facilitated in reporting the crime and demonstrating that appropriate precautions had been taken. Accordingly, driver safety may be improved and freight thefts and or losses via contamination reduced.

14 Claims, 3 Drawing Sheets

(51) Int. Cl.
*E05B 67/38* (2006.01)
*G06Q 50/28* (2012.01)
*G08B 13/06* (2006.01)
*G06Q 10/08* (2012.01)
*G08B 13/24* (2006.01)

(52) U.S. Cl.
CPC ..... *G06Q 10/0832* (2013.01); *G06Q 10/0833* (2013.01); *G06Q 50/28* (2013.01); *G08B 13/06* (2013.01); *G08B 13/2462* (2013.01)

(58) Field of Classification Search
CPC ................ G06Q 10/0833; G08B 13/06; G08B 13/2462; G08B 13/19697
See application file for complete search history.

(56) References Cited

U.S. PATENT DOCUMENTS

| | | | | |
|---|---|---|---|---|
| 2007/0262861 | A1* | 11/2007 | Anderson | G06Q 10/025 340/539.13 |
| 2012/0028680 | A1* | 2/2012 | Breed | B60N 2/0232 455/556.1 |
| 2012/0235791 | A1* | 9/2012 | Donlan | G06Q 50/28 340/10.1 |
| 2013/0342343 | A1* | 12/2013 | Harring | H04L 63/102 340/521 |
| 2014/0344077 | A1* | 11/2014 | Smith | G06Q 30/018 705/14.73 |
| 2018/0097884 | A1* | 4/2018 | Terwilliger | H04L 67/24 |

\* cited by examiner

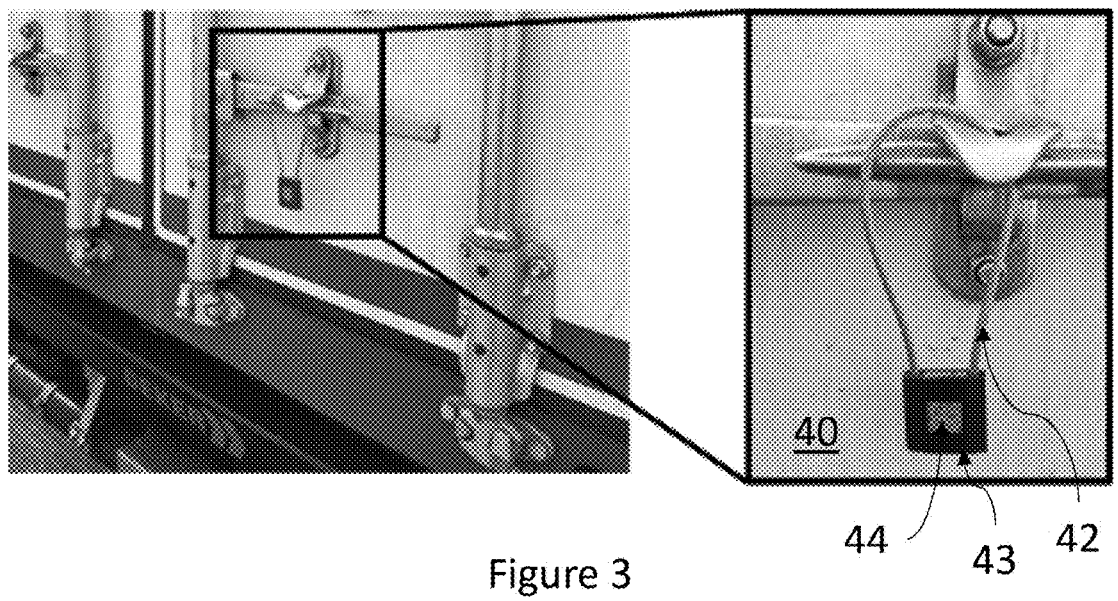
Figure 3
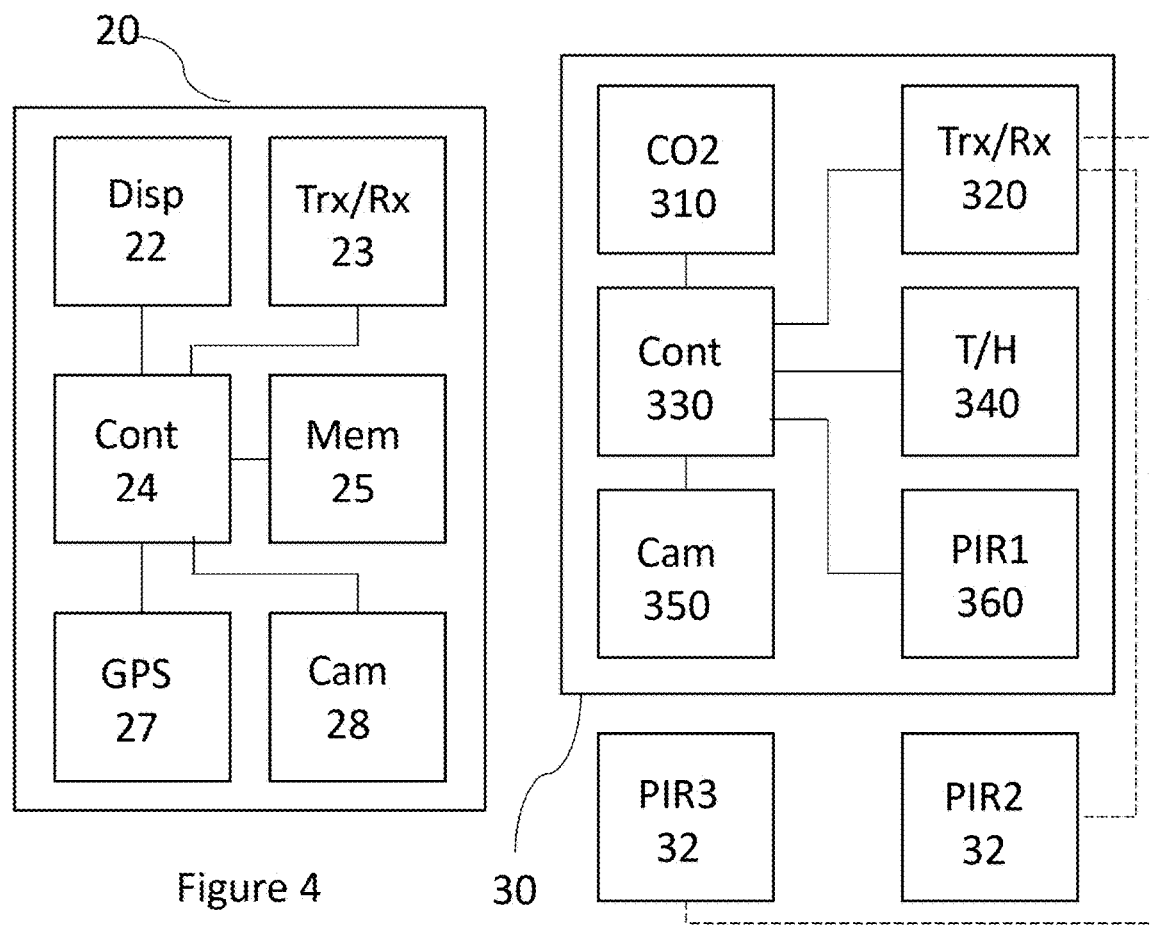
Figure 4
Figure 5

ROAD FREIGHT TRANSPORT SECURITY SYSTEM

TECHNICAL FIELD

The present invention relates to a road freight transport security system. Embodiments of the invention relate to a security system applicable to a vehicle such as a lorry or the like, in which a combination of smartphone app, sensor device(s), tamper-proof seal and database provide enhancements in security.

BACKGROUND

The road transport sector is growing every year, as is road freight crime. Road freight transport is essential to all modern economies, linking supply to demand and connecting multiple industrial sectors. Road transport brings most goods to their final destination and is indispensable to the well-being of any successful economy connecting national and international markets to their customers. Therefore, commercial road freight vehicle security is an essential component of this industry.

There has been a 41% increase in the value of freight cargo stolen or contaminated across Europe in the last 10 years, from both opportunistic theft and specific targeting by organised criminal gangs. Estimated losses in the EU are over €11 billion per year. The average loss per theft rose to €68 k in 2016, with the largest single loss being in excess of €4 million. This causes increased operator costs due to damaged vehicles, lost freight and increased insurance premiums.

On average there are over 5000 recorded illegal border crossing attempts each month. There were over 2 million freight vehicle border crossings into the UK in 2016 and 3552 illegal migration incidents that resulted in €8.8 million of fines to drivers and operators. Drivers across Europe are at an increased risk of violence from all forms of migration.

Since the Immigration Act 2014, and associated Code of Practice, to avoid penalty fines of £2000 per illegal entrant, all drivers and operators entering the UK must demonstrate an effective security system, robust security devices, security training on the system and a check list to be followed; recording each check and proof that the checks are being completed, to adequately secure their vehicle.

The available security devices have certain limitations, and the manual paper-based procedures currently prescribed to satisfy the relevant regulations are flawed as they do not ensure the driver actually completes the necessary checks. The present invention is intended to provide an improved security system for road freight transport, in view of the above.

SUMMARY OF THE INVENTION

According to an aspect of the present invention, there is provided a road freight transport security system for a vehicle, comprising:
  a database;
  a portable electronic device running a security application, the security application being configured to prompt a user to carry out a plurality of external security checks of the vehicle, provide a facility for the user to confirm completion of those checks, provide a facility for the user to associate one or more photographs, taken by the portable electronic device, with one or more of the checks, and to upload log data to the database, the log data indicating at least a date, time and location of completion of the checks; and
  a sensor device, mounted within a freight area of the vehicle, having one or more sensors, and being operable to communicate an alert to the portable electronic device in the event that an anomaly is detected inside the freight area.

The anomaly may be an unauthorised entry into the freight area.

In this way, real time detection of security breaches within a freight trailer or container may be achieved. The driver is not required to engage directly with an intruder, and is facilitated in reporting the crime and demonstrating that appropriate precautions had been taken. Accordingly, driver safety may be improved and freight thefts and/or losses via contamination reduced.

The portable electronic device may be the driver's smartphone, or may be a tablet device. The security application may be an app (software application) running on the smartphone or tablet device.

Preferably, one or more tamper proof seals are provided for sealing the freight area of the vehicle, the tamper proof seal bearing a unique identification code (such as a barcode or QR code), wherein the security application is configured to provide a facility for the user to scan the unique identification code as an external security check. The seal may be tamper proof in the sense that, once broken to gain entry to the freight area of the vehicle, it cannot readily be repaired in such a way that it is restored to its original appearance. In the example implementation described herein, this is achieved by use of a steel cable which frays visibly when cut. A replacement seal would not have the same unique identification code as the original seal, and so both repair or replacement of the seal can be detected.

Preferably, the unique code can also be used to meet customs requirements.

The log data may include any and/or all information recorded as part of the security check, including date, time and location of check completion, identity of the driver and/or vehicle, an indication of checks completed (e.g. which features or areas of the vehicle have been inspected by the driver) any photographs captured by the driver using the portable electronic device to provide evidence of particular checks, a photograph of the seal, the unique identifier of the seal, any alarms generated by the sensor device, any sensor outputs generated by the sensor device (or data generated from those sensor outputs), any photographs or video footage captured by the sensor device.

Preferably, the log data cannot be modified once generated (or optionally once stored to the smartphone and/or to the database). This provides assurance that the log data accurately reflects real world events, and has not been tampered with.

The software application may be configured to electronically record (as log data), in association with each confirmed check and/or photograph, a GPS location, date and time. The record may be made locally (on the smartphone or other portable electronic device), as well as being uploaded into the database.

Similarly, the software application may be configured to electronically record (and upload to the database, as log data) the identity of the driver and/or the identity of the vehicle.

The sensor device may comprise one or more of a motion detector, a $CO_2$ sensor, a temperature sensor, and a humidity detector. The motion detector may be a passive infrared sensor. The sensor data, optionally including any alerts generated based thereon, may be recorded by the software application and uploaded to the database as log data.

The sensor device may comprise a camera, and maybe responsive to the detection of an anomaly to capture an image of the interior of the freight area. The image may be provided to the driver's The sensor device may have an active mode and a dormant mode, wherein when in the dormant mode the sensors will be powered down.

The sensor device may be powered independently from the vehicle, for example by a battery. Preferably, the battery is in a locked compartment of the sensor device, requiring a physical key or combination to unlock—reducing the likelihood of a third party bypassing the sensor device by removing the battery.

The security application may permit the user to switch the sensor device between the active mode and the dormant mode.

The sensor device may comprise a magnetic mount for removably fixing the sensor device at any desired location within the freight area.

The seal may comprise a pre-tensioned steel wire rope, which if cut will fray.

Preferably, the driver can automatically contact the appropriate security authorities based on their GPS location.

A single portable electronic device may be configured to control and receive alerts from multiple sensor devices (potentially located in different vehicles). The control and alert receiving function can be handed over to a different portable electronic device without having to enter the freight area of the vehicle.

Notably, the system makes strong provision for the detection of unauthorised entry into (via the seal) and presence within (via the sensor device) an internal freight area of the vehicle. As a result, internal checks of this area are not required, saving time and reducing the amount of data required to be captured and stored by the system.

The present technique integrates certain existing technologies to create a system to ensure drivers and operators are fully compliant, including 3rd party assurance, with current border authority legislation and codes of practice to make it much less likely that the driver (or their employer) should receive penalties.

Further aspects of the invention include a smartphone app operable to communicate with a sensor device and server as defined above and described herein, and a sensor device operable to communicate with a smartphone app as defined above and described herein.

It will therefore be appreciated that embodiments of the present invention seek to provide 3rd party independent assurance that all necessary commercial vehicle security checks have been completed, in accordance with border authorities (UK Border Force and EU Border Force) legislation/guidance, to prevent penalties due to clandestine entrants (illegal migration) being found on board, and in doing so, reduce the risk of cargo theft/contamination particularly by organised criminal groups and increase national border security.

It will be understood that currently, compliance is evidenced via a paper check list which fails to prove when, where or even if the checks required were completed.

The software app of the present invention permits freight drivers to electronically record each and every statutory pre-start check, the identity of the driver, the identity of the vehicle, and the GPS location, date and time with jpeg images of each check point. This provides a much more reliable, secure system than the existing paper checklist which was widely abused. The software app thus provides a sterile record of compliance for the driver.

The sensor device is placed within a freight trailer or steel container when loading freight, once secured and the journey commences. At each stop prior to restarting the journey the device is activated and the driver will be informed of any breach of security using three or more checks, including passive infrared detection, $CO_2$ detection and or jpeg image or video recording shown on the driver connected mobile phone. It will be appreciated that the system does not need to be active while the vehicle is in motion, since access to the vehicle when mobile can be assumed to be highly unlikely. It is therefore operated prior to engine start-up, rather than while the vehicle is being driven. As well as saving battery life, this means that the driver will not be distracted by any (false) alerts which occur while driving, for example when freight shifts within the vehicle.

The system has been developed with an objective to enhance driver safety and monitor freight and vehicle security. The electronic components enhance and produce sterile records of compliance, replacing outdated paper checks which were widely abused. The sterile records of compliance are supported by step by step jpeg (image) evidence. Using the system, this can be achieved in 50% of the allotted Code of Practice time. The system may be used to counter organised crime freight theft, while reducing freight contamination losses. Immediate evidence of unlawful migrant entry into trailers is provided, and any such breaches indicated can be immediately actioned by the driver's controlling action from his mobile phone. This includes an emergency call feature that automatically selects the appropriate emergency number to alert authorities of an incident based on the drivers' phone's GPS location.

The sensor device is connected to the driver's smart phone using an encrypted secure WiFi connection. It has multiple sensors to detect unauthorised entry into the trailer and sends an alert/alarm to the driver's smart phone if the alarm threshold is triggered, and also takes a photo which is date/time stamped as evidence of the internal check.

Using a "Fleet Operator Administration Portal", a fleet operator has read only access to the sterile data to ensure drivers are using the system correctly. Via the portal they can check drivers are complying with the operator's own instructions, conducting and completing checks at the correct times and to the correct standards. If required by Border Authorities, the operator can produce an evidence report, for a particular trip, to use as evidence of compliance with the codes of practice and avoid civil penalties.

In some embodiments the driver can automatically contact the appropriate security authorities based on their GPS location. Here, the driver does not need to know which authority is the correct one, since this is automatically determined by the system based on current location.

In some embodiments a single portable electronic device is configured to control and receive alerts from multiple sensor devices, and the control and alert receiving function can be handed over to a different portable electronic device without having to enter the freight area of the vehicle. In this way, one phone/app can control and receive alarms from multiple devices and remotely these devices can be handed over to another driver (using remote reset) without having to enter the trailer and physically touch the device (for customs security).

BRIEF DESCRIPTION OF THE DRAWINGS

Embodiments of the present invention will now be described by way of example only with reference to the accompanying drawings where like parts are provided with corresponding reference numerals and in which:

FIG. 3 schematically illustrates the tamper proof seal;

FIG. 4 schematically illustrates the portable electronic device (smartphone) of FIG. 1;

FIG. 5 schematically illustrates the sensor device of FIG. 1;

DETAILED DESCRIPTION

The present disclosure describes improved freight vehicle security systems for individual and fleet operators to improve vehicle security.

Figure 1:
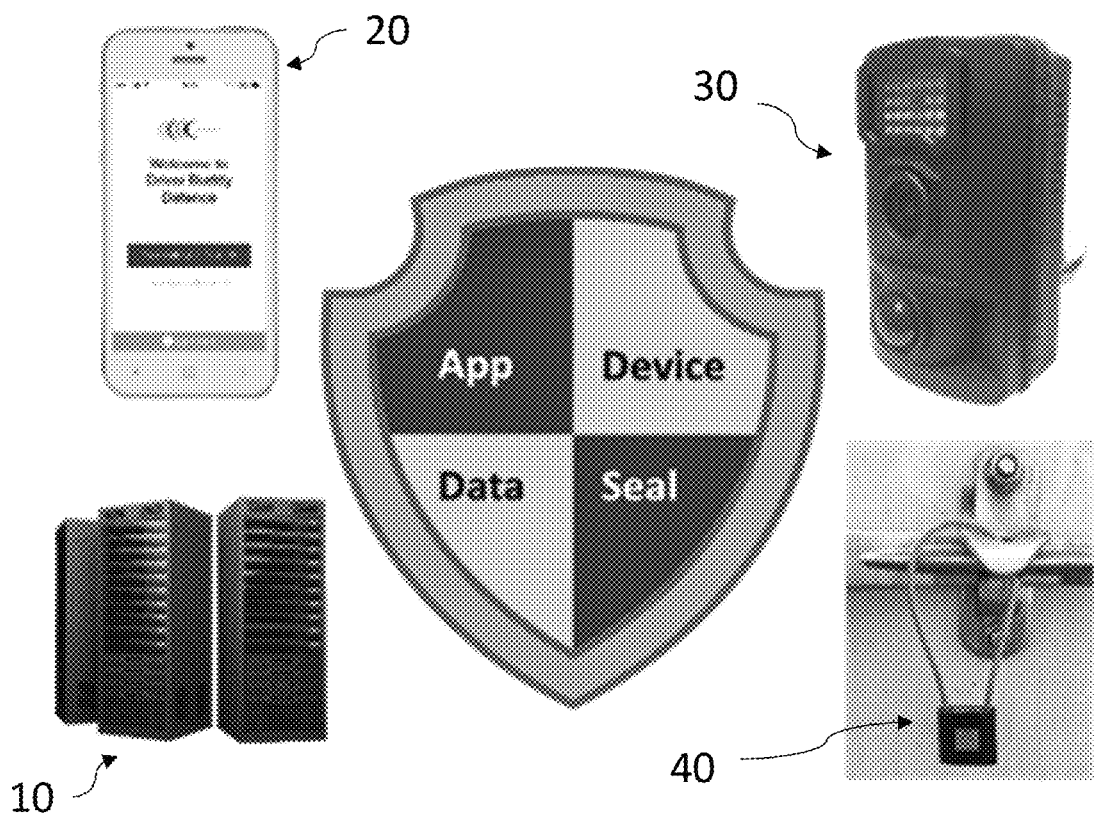
FIG. 1 schematically illustrates the overall system.

The system is an integrated commercial vehicle security system comprising four main elements, which are illustrated in FIG. 1:

A. An external electronic security checklist conducted via a smart phone 20 app which once completed is uploaded to a secure (sterile) database 10 to prove compliance.

B. An internal integrated mobile detection device (sensor device) 30 with carbon dioxide sensor, passive infrared motion sensors and infrared camera to alert the driver of unauthorised entry into the trailer, send alerts to the driver's smart phone (camera snapshots and alarm) via an encrypted WiFi connection, and prove check compliance without requiring access to the trailer in conjunction with the external check.

C. A tamper proof and uniquely QR coded rear door security seal 40 that is recorded by the external check of the smartphone app.

D. The sterile database 10 to store evidence of completed checks (received from the smart phone app), produce compliance reports and provide assurance of compliance with company operating procedures.

The system uses two smart phone apps in the present implementation, although these could of course be implemented instead as a single application. In either case, the system uses the driver's own smart phone 20 (or other portable electronic device, such as a tablet) to record the external checks required and control the sensor device 30 inside the trailer.

FIG. 4 illustrates the relevant hardware and functionality of a suitable smartphone 20. In particular, a display 22, a transceiver 23, a controller 24, a memory 25, a GPS unit 27 and a camera 28 are provided, these being conventional elements of a modern smartphone. In use, the controller 24 (which may be implemented as one or more processors) controls the overall operation of the other elements, including executing software stored in the memory 25, storing data into the memory and retrieving data from the memory 25 as required. The transceiver 23 is able to communicate via WiFi, Bluetooth and 3G/4G with external devices, such as the external server (by WiFi or 3G/4G) and the external sensor 30 (for example by Bluetooth or WiFi). The GPS (global positioning system) unit 27 is able to identify a current location of the smartphone 20, although alternative positioning strategies could be used such as WiFi or cellular localisation. The camera 28 is able to capture an image, which can be stored into the memory 25, displayed on the display 22, and transmitted externally by the transceiver 23, for example to the server 10. It will be appreciated that the security application also serves to relay sensor, alert and image data received from the sensor device to the server 10.

In the present implementation, the two apps implementing the system, and which are stored in the memory 25 and executable by the controller 24, are:

An external checklist app which uses existing software and hardware functions of the smartphone, such as the camera, GPS location data and QR code reader. The checklist app facilitates the capture of security checks carried out by the driver. The app guides the driver through the physical external checks that must be completed as part of their pre-start security checks (that is, an electronic check-list is provided), and records these in the database as unique "Trip Logs" via a mobile internet connection (3G/4G). The driver will need to go through (by way of visual inspection) and mark each item on the check list as completed. In some cases, photographic evidence may be provided by (or requested of) the driver, achieved by way of a built-in camera of the smartphone. As part of these checks the driver is required to take a photograph of the seal 40 showing it is fitted and record the QR code displayed on the seal 40 using a QR code reader function within the app. The seal 40 has embedded in the QR code both a sequential code for each fleet operator and also an encrypted unique code to prevent the seal from being replicated.

A detection app connects wirelessly to the sensor device (for example via a WiFi hotspot generated by the sensor device), controls the sensor device settings (user defined parameters), receives alarms from the sensor device, and stores/uploads evidence of alarms/checks to the database.

The driver may be required to utilise the checklist app in a variety of circumstances, such as when loading freight, when unloading freight (to ensure clandestine entrants have not entered the vehicle), at rest stops, at fuel stops, prior to boarding (tunnel or ferry), and following the vehicle being left unattended by the driver.

When carrying out a check, each check "log" has the following elements: (a) start a new trip or enter a log onto an existing trip, (b) enter driver and vehicle details, (c) complete checks relevant for vehicle type, (d) check sensor device, (e) upload check log to database 10, and (f) upload sensor device photo/check to database 10. The pictures for driver photo, registration plate and trailer plate at (b) should be clear enough to act as evidence by who and for what vehicle the check was completed; and it should be possible to read the registration marks.

The checks required to be carried out by the driver will depend on the vehicle type, and the app will prompt for the appropriate checks based on the type of the vehicle. The checks may be drawn for example from the following list: axel, below trailer, fuel tanks, rear door seals, roof, side 1, side 2, tractor/trailer Suzie connection, underside of trailer, wind deflector, wired seal, refrigerated container, tanker ports, transported vehicles. For each (or some) of the selected checks, the driver may capture an image of the relevant part or area of the vehicle/trailer, which are stored as evidence of the check.

The driver should take the correct photos of any required checks to ensure they are stored correctly in the database 10 as evidence if required for a report to prove compliance. For example, check requirements to prove the check has been completed and where possible evidence that a clandestine entrant is not hidden in that location may include:

(i) For the axel, an image showing that vehicle trailer axels are clear.
(ii) For below trailer, an image showing that any compartments or storage under the trailer are clear.
(iii) For fuel tanks, an image showing that the fuel tank is clear.
(iv) For rear door seals, this is a two part check, the first being a photo of the seal fitted showing the one time use cable passing through the seal and the QR code, and the second using the QR code reader to record the QR code.
(v) For the roof, if the driver has access to the inside of the trailer a photo can be taken of the roof from the inside. If the driver does not have access to the trailer, the roof should be checked in the safest and most effective way possible. For example, using either the sensor device camera snapshot or live streaming from the inside and the best picture of the roof from the outside to show the check is completed.
(vi) For each of the sides, an image showing that side of the trailer.
(vii) For the tractor/trailer Suzie Connection, an image showing that the tractor/trailer connection is clear and driver has checked all areas.
(viii) For the wind deflector, an image showing that the wind deflector has been checked and is clear.
(ix) For the wired seal, an image showing the TIR cord (wired seal) is in place and has been checked all around the vehicle.

At the end of all necessary checks the checklist app will ask if the sensor device (monitor check) has been completed. The driver needs to have fitted the sensor device and using a camera capture function of the sensor device to take a picture to be uploaded via the detection app as evidence of the internal check.

Once checks are complete the driver is required to sign in with their unique driver ID and password for the data to be uploaded to the server 10. Summary details of uploaded trips can be seen from a "view recent logs" function on the app home page. The smartphone app also has an emergency call function which the driver can use to connect to the appropriate authorities if there is a security incident. This option may be presented to the user automatically when an alert is generated by the sensor device. The smartphone app also permits the driver to be able to log comments, such as giving a reason for a particular stop (to refuel, break down, rest break etc.). This information may also be relevant for audit trail purposes.

The smartphone app therefore provides a quick, easy and cost-effective way to ensure driver compliance with the UK (or foreign) code of practice. It records and stores in a sterile 3rd party database the GPS location, date/time stamp and photographic evidence of each pre-start check which can be produced as proof of compliance, if required by border authorities, to minimise or at least reduce the likelihood of prosecution or incurring civil penalties if an illegal is found. This provides a sterile 3rd party assured audit trail of completed checks. A fleet admin portal is provided which allows operators to analyse data within the database and ensure user (e.g. driver or fleet) compliance.

Figure 2:
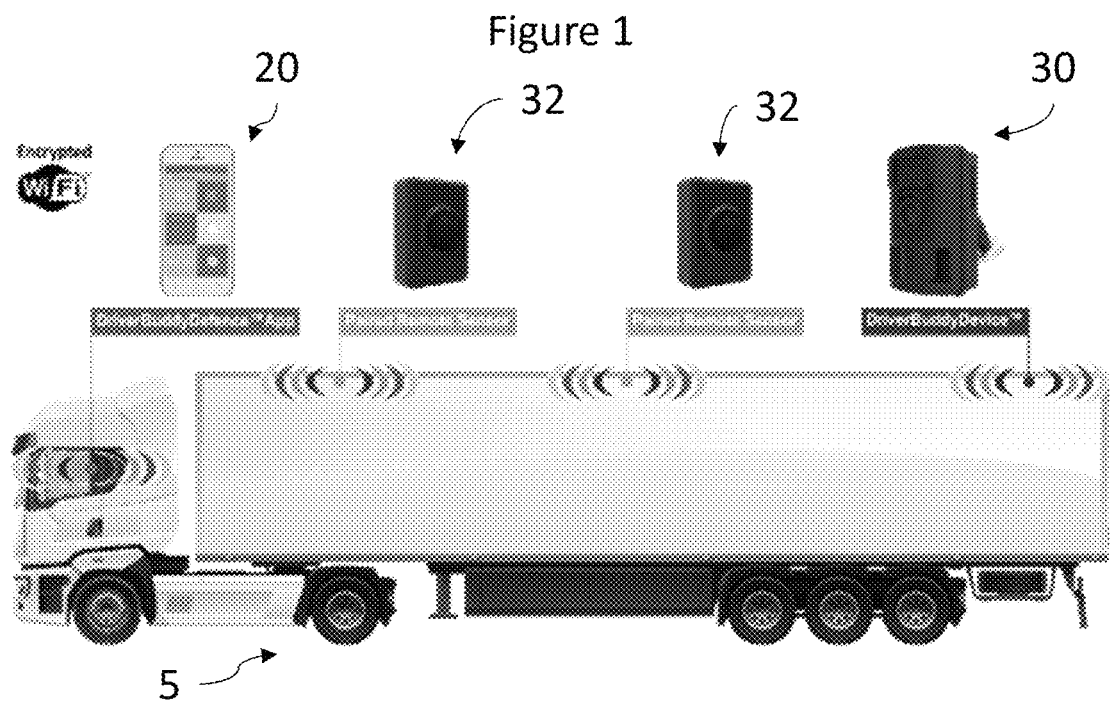
FIG. 2 schematically illustrates the system of FIG. 1 as applied to a freight vehicle.

The sensor device 30 is a mobile, battery operated (thus not reliant on a vehicle power-supply) integrated detection and monitoring device that is placed inside the trailer unit (as shown in FIG. 2) prior to the trailer unit being secured (locked). FIG. 5 illustrates the sensor device 30. In FIG. 5, the sensor device 30 can be seen to comprise a CO2 sensor 310, a transceiver 320, a controller 330, a temperature sensor and humidity sensor 340 (these are illustrated as a single element in the interests of simplicity, but may be provided as separate sensors/components within the device 30), a camera 350, and an integrated passive infrared sensor (PIR1) 360. A memory (not shown) may be provided, to temporarily store images captured by the camera 350 and data obtained from the sensors prior to these being transmitted to the smartphone 20 and/or database 10. Two external passive infrared sensors (PIR2, PIR3) 32 are also shown to be wirelessly connected to the sensor device 30 via the transceiver 320. In use, the controller 330 (which may be implemented as one or more processors) controls the overall operation of the other elements of the sensor device 30. The transceiver 320 is able to communicate via WiFi or Bluetooth (and in some implementations 3G/4G) with external devices, such as the smartphone 20 and external sensors 32.

When active, the sensor device 30 monitors CO2 levels within the trailer unit (using the CO2 sensor 310), the temperature and humidity within the trailer unit (using the temperature sensor and humidity sensor 340), and movement via a motion sensor (PIR) 360 contained in the device. The sensor device 30 has a day and night (Infrared) camera 350 to take pictures (evidence of check) or provide live streaming video on request from the user or takes a picture when an alarm is triggered based on one or more sensors satisfying predetermined or user defined thresholds. The IR (infra-red) camera may take snap-shot images or provide live video streaming direct to the driver's phone only if required and safe to do so (for example, when the vehicle is stationary). These may provide evidence of a check being completed or permit real time inspection of the trailer. More generally, images or video feed may be captured on demand from the smartphone 20, as part of a check, or in response to an alert, or at fixed intervals. The images and/or video may be stored locally at the sensor device and/or transmitted for storage at the smartphone 20 and/or server 10.

The sensor device 30 can also be paired with up to 6 remote PIR Motion Sensors via RF433 32 to enhance the detection capability either for anti-theft or to account for different cargo loading patterns. It will be appreciated that the layout within a trailer, and the presence of containers and other freight within, may make it difficult or impossible to provide good coverage of the whole interior of the trailer with a single passive infrared sensor. Unauthorised trailer entry may thus be detected with a mobile monitoring device (the sensor device 30) that alerts the driver's phone 20.

In more detail, the carbon dioxide sensor is used to monitor the carbon dioxide levels inside the trailer. Due to the relatively poor exchange of air between the inside and the outside of the trailer, if one or more persons are present inside, the carbon dioxide level will gradually increase. This will trigger alerts if elevated by unauthorised entry, and does not require line of sight between the sensor device and the person inside the trailer, thereby complementing line of sight sensing techniques such as PIR. The CO2 detector is sufficiently sensitive that it will detect a person in the trailer with a 100 ppm increase in CO2 within 10 minutes. The alarm threshold can be adjusted if required to account for various cargos and ambient CO2 conditions. Similar principles apply to the detection of temperature and/or humidity. That is, the presence of one or more people within the container unit can be expected to have some impact on these parameters, either due to their own biological processes (generating heat, respiration and perspiration for example), or due to a breach in (for example) the container unit permitting air in from the outside and/or releasing air from within the container. Accordingly, an alert may trigger if (for example) the temperature increases or decreases by a threshold amount, or exceeds a fixed threshold or drops below a fixed threshold, or increases or decreases faster than a threshold rate. Similarly, an alert may trigger if (for example) the humidity increases or decreases by a threshold amount, or exceeds a fixed threshold or drops below a fixed threshold, or increases or decreases faster than a threshold rate.

The CO2 sensor measures the CO2 in the trailer in parts per million (ppm). When enabled the sensor takes readings every minute for the first 3 minutes and then every 6 minutes (or longer if changed in settings). The average CO2 ppm in open air is approximately 400-550 ppm. If a person enters the trailer the CO2 level will increase (due to breathing out CO2) approximately 100 ppm over a 6 min period. A CO2 alarm threshold may be set once the trailer has been loaded and secured, without a person inside the trailer for at least 10 mins (someone inside the trailer loading will raise the CO2 level) the driver should check the CO2 level in the trailer on the device, and then in "settings" set the upper and lower CO" alarm limit to be 100 above and below this number (for example).

Figure 6:
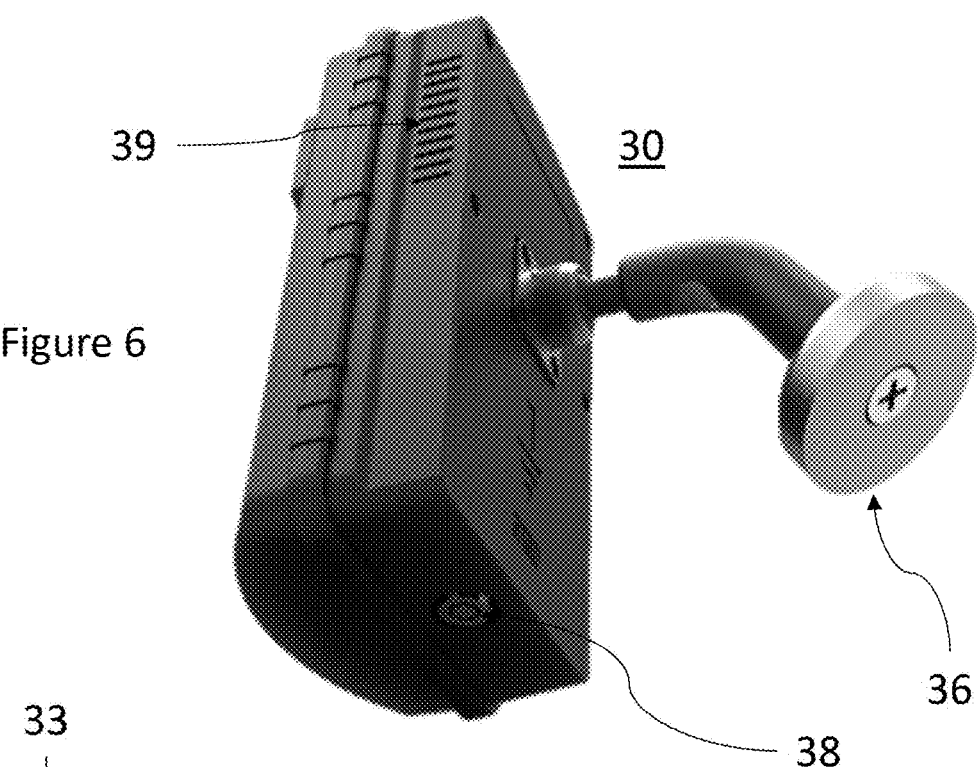
FIG. 6 schematically illustrates the sensor device when viewed from below and behind, showing the lockable battery compartment cover and magnetic mount.

As shown in FIG. 6, the sensor device 30 comprises a strong magnetic mount 36, enabling the sensor device 30 to be fitted into most trailers. The magnetic mount 36 permits the device to be moved by the driver to any suitable location within the trailer, to take account of the physical distribution of freight within the trailer. The magnetic mount is designed to fix (magnetically) to steel bulkheads in the trailer and is sufficiently strong to resist vibration and accidental knocks. It is removable by hand but requires a concerted effort to do so. Alternative fixing mechanisms may also be provided, such as mounting holes for screw mounting the device, or a Velcro strip or similar. The device, including the casing (preferably formed of a plastics material) has been designed to resist the shock, vibration and damage associated with being placed in a commercial freight environment. The sensor device 30 is battery operated, and the battery compartment is fitted with a lock 38, to prevent unauthorised removal of the battery to circumvent sensor operation. A vent 39 is also visible in FIG. 6, through which the CO2 sensor is able to operate.

The sensor device 30 and remote PIRs 32 are fitted with magnets and so depending on cargo loading pattern and security risk can be placed as required by the driver onto the steel bulkheads or trailer structure. The camera has day and night (IR) capability and with 120□ view angle and so should be placed high in the trailer to maximise the view of the trailer and cargo. The driver can check the placement and view by pressing a "Live" button in the app. The camera should preferably be placed facing roughly 45□ downwards to minimise the view of the roof and maximise the view of the trailer loading area. The motion sensor detects movement of warm objects (humans) as they pass the sensor up to a max range of 10 m and view angle of 140□. The motion sensor is "line of sight", therefore if there is cargo blocking its view of movement, then it cannot detect the movement. For this reason, two or more remote PIRs are included and once connected to the sensor device 30 will also trigger an alarm if movement is detected.

Figure 7:
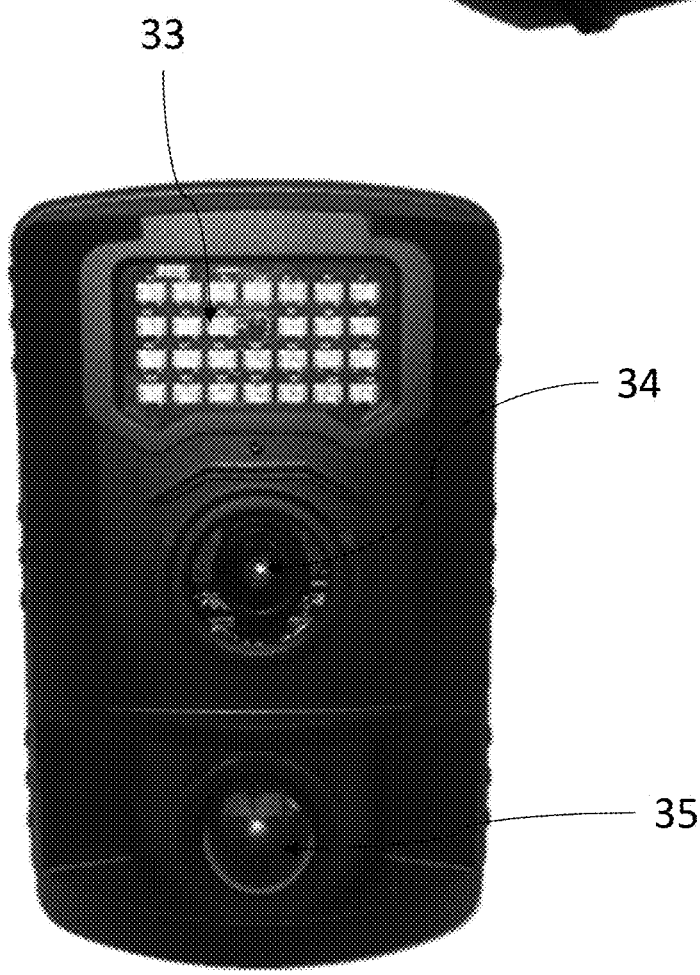
FIG. 7 schematically illustrates the sensor device when viewed from the front, showing the PIR sensor and camera.

In FIG. 7, the physical exterior of the front of the sensor device 30 is visible, presenting an IR LED cluster 33 to provide IR illumination, a lens 34 of the camera 350, and a lens 35 of the PIR sensor 360.

The sensor and alarm device 30 is wirelessly connected to the driver's smart phone 20 using an encrypted secure WiFi connection. In particular, the sensor device 30 connects to the phone 20 via an encrypted WiFi hotspot that is unique to the phone and the sensor and alarm device. The WiFi hotspot preferably has a minimum clear line of sight range in excess of 200 m and the strength of connection from trailer to cab will vary depending on the construction of the trailer and cab.

As well as having multiple sensors to detect unauthorised entry into the trailer, the sensor device 30 is able to send an alert/alarm to the driver's smart phone if an alarm threshold is triggered, and also takes one or more photos which are date/time stamped as evidence. The optical camera 350 is wide angle to maximise the field of view for the driver. The optical camera 350 may take a relatively long period of time (for example 10 seconds) to operate in order to save on battery consumption. The optical camera 350 captures an image automatically when the PIR or CO2 detectors trigger an alarm. The IR camera 350 offers clarity of image for full length of trailer in total darkness. The motion sensor(s) (passive infra-red) 360, 32 is/are designed with a wide-angle field of view and its sensitivity can be adjusted to account for curtain sided vehicles or moving cargos. As discussed above, multiple PIR sensors may be provided. One may be integral with the sensor and alarm device, while one or more others may be separate units which are slave devices able to communications wirelessly with the sensor and alarm device (as a master). The PIR sensors sensitivity can be adjusted to account for ambient conditions and cargo loading patterns. The sensor and alarm device is controlled by the driver's smart phone app, and the data produced is uniquely linked to trip logs produced by the app, and is stored in the database as evidence. The device also alerts the driver if the battery is low and needs replacing or if the connection to the device is lost which may indicate a technical problem or malicious damage to the sensor device 30 both of which require action or further investigation.

The sensor and alarm device 30 can be placed remotely into "sleep mode" using the driver's mobile phone 20 when not required, for example when driving or when the vehicle is stored in a locked facility, which increases battery life. When active, the sensor and alarm device 30 sends alarms to the driver's phone 20 to alert the driver of a potential problem when sleeping in the cab or when parked near a motel. The sensor and alarm device settings can be adjusted to match local conditions, load configurations and driver preferences. The sensor and alarm device 30 sends the driver a low battery warning when its state of charge is below a threshold level, and is supplied with two rechargeable lithium ion batteries, a mains charger and a 12 v adapter.

The seal 40 is a one-time use tamper proof security seal intended to prove that the vehicle has been checked and appropriately secured. The seal 40 is shown in FIG. 3. The seal is formed of metal, and uses a pre-tensioned steel wire rope (SWR) 42. If cut, the SWR will fray, with the result that it cannot be glued to deceive the driver during a subsequent check. The one-time use ensures that any tampering or attempt to replicate can be avoided and detected by applying pre-tension to the SWR so if it is cut it immediately frays and prevents gluing the SWR to avoid detection. A body 43 of the seal 40 comprises a one-way connector through which the steel wire rope 42 passes to secure the seal 40 in place. The steel wire rope cannot pass through the seal 40 in the other direction. The one-way system in the seal 40 prevents the seal from being reused or replaced and the unique sequential QR code 44 prevents replication and meets customs regulations. The seal is recorded by the software app and the data stored in the database.

The QR code identifies the fleet operator and is unique (not replicable) to that seal in line with the code of practice. In use, the app is operable to read (scan) the QR code 44 and securely store the data in the database 10 as evidence of the check. A photograph of the intact seal may also be included in the data stored to the database 10. This ensures there is a secure audit trail of security seals being used and not replaced during transit to prevent organised crime.

The database 10 is a sterile, protected database to store the data captured from each of the software app checks, the security seal QR code and sensor device data. The database has its own administration system that allows for analysis of data stored, fleet support and evidence of completed checks and compliance with legislation if a driver or the operator is facing penalties. The encrypted protocol plus sterile data transmission provides clear evidence of driver compliance to Code of Practice. The data once formulated cannot be changed by the driver or fleet operator so thus can be produced as sterile evidence if required.

The security checks uploaded are secure and sterile and therefore if the system has been used correctly the evidence from the database provides the best possible mitigation to prosecution or fines by border authorities. The database provides evidence and 3rd party assurance of drivers' compliance with operator's security standard operating procedures and can therefore proactively prevent security breaches.

Initially, the data is stored securely on the driver's phone, if a 3G/4G connection is not available, and can be used as proof of checks being completed if required. The data is uploaded to the database once a mobile connection is re-established or using Wi-Fi. The app records all the relevant details including driver ID, vehicle details, date/time/location of checks and photographic evidence that the checks required have been completed which cannot be altered once saved.

To use the system, the operator/driver registers an account to gain access to the system database to store evidence of check compliance. At the beginning of each journey or after an unattended stop the driver conducts a pre-start security check list using the software app, which logs the driver, vehicle, trailer, time/location and all the necessary checks as a trip log. The driver connects to the sensor device and installs it inside the trailer checking the trailer is clear and secures the trailer with the seal recording details with the smartphone app. The driver checks the device readings and then sets the device alarm threshold parameters (for temperature, $CO_2$ etc.) depending on conditions and cargo. Once complete, the driver takes a photo of inside the trailer and uploads it to the associated trip log created by the smartphone app. This process repeated at each pre-start check creates the necessary evidence to avoid penalties by a border authority. If an evidence report is required, this can be produced from the database as a single report document.

The smartphone app records the external security checks made by the driver, taking photographic evidence that is unique to the driver and vehicle to ensure compliance with freight security legislation, deter organized crime and prevent prosecution by border security agencies due to clandestine (illegals) being found on the vehicle. The checks, referred to as "trip logs" are uploaded to the database via a 3G/4G connection (or WiFi) and the Internet, and stored securely in the server 10.

The checklist is designed to ensure compliance with Border Authorities guidelines and therefore provide 3rd party assured evidence that the organization/driver that is employing the system meets their key criteria to prevent penalties if a clandestine entrant if found on board. The system is not designed to be used while driving as this would be an unsafe practice but the driver can receive alerts so that appropriate action can be taken when it is next safe to do so in accordance with company protocols.

Generally, and as discussed above, the system consists of four key elements (smartphone app, sensor and alarm device, security seal and security database). Each element, individually and in combination with one or more others of the elements, contributes to improved overall vehicle and freight security, but all four elements together provide the best possible protection, detection and deterrence to criminal activity. The system is designed to protect against, detect and deter criminal activity through enhanced physical security and detection using the security seals and sensor and alarm device, and increased driver security awareness through using the smartphone app to conduct external checks. The system does not prevent a determined criminal or clandestine from gaining entry to the trailer, but it will detect the entry and alert the driver. The system uses 3rd party secure photographic evidence as proof that the driver/transport company had an effective security system in place, used the system correctly and therefore had no reasonable grounds to suspect that a clandestine entrant was concealed in their vehicle.

The described security systems are intended to be easy-to-use, cost-effective and reliable, and are intended to protect against, detect and deter clandestine and criminal activity against drivers, vehicles and freight to significantly increase their overall physical security and support wider security awareness, in addition to improving national border security. The described system enhances the overall security of vehicle freight through a combination of increased physical security and improved driver security awareness. Physical security is provided by the seal, which is a sequentially numbered unique tamper proof lock for the trailer and a sensor and alarm device, which is an integrated internal detection and alarm system. These features, combined with increased driver security awareness through use of an associated smartphone/portable device app, which enforce mandatory pre-start checks, ensures or at least facilitates compliance with Border authority codes of practice and increases overall vehicle security.

The smartphone app replaces the UK Border Force external paper vehicle security checklist and provides 3rd party assurance of the checks having been completed. Without the sensor and alarm device and/or security seals, internal checks and physical security measures, such as a padlock, would still be required. With these elements being present, it is sufficient for only external checks to be carried out. In particular, the sensor and alarm device can be used to monitor the interior of a trailer and to conduct internal checks without entering the trailer, but without the smartphone app there would be no access to a database to store the evidence, and therefore mitigate a civil penalty if a clandestine entrant was found. The security seal can be used to secure trailer doors or tilt cord with a unique serial number and one-time tamper proof design, but without the smartphone app and security database, there is no evidence trail to prevent civil penalties nor detect and deter organised criminal activity.

It may be necessary for one portable electronic device (e.g. smartphone) to be able to control and receive alerts from multiple devices. This is because:

In Europe it is not uncommon for one tractor/cab to pull a double trailer and therefore one phone would need to control at least 2 devices, one associated with each trailer.

Some TILT (curtain sided trailers) are double stackers to maximise capacity and therefore to maximise security it would be possible to fit 2 devices in one trailer, controlled by one phone.

Some modal logistics companies use multiple methods to transport freight. For example, goods may be transported for a first leg of a journey in a semi-trailer (normal box body) but without a tractor/cab. Initially the box body may be moved by rail, then by ferry and back onto rail before being picked up by a truck. Accordingly, a freight manager in charge of multiple trailers on a ferry (for example) would need to be able to connect to multiple devices to check they were secure.

Many operators pull trailers for certain legs of a journey and then handover the trailer to another company who complete the rest of the journey. Due to customs reasons or with trailers carrying high value cargo it is often the case that once loaded the trailer is sealed and the driver does not have access to the inside. The present system therefore comprises a software reset (remote reset) button in the settings of the software application to permit the driver to reset the device from outside the trailer, thereby making it ready for a different driver to connect to and effect a handover.

There are benefits to using a 3G/4G connection and external antenna connection method to provide real time tracking of the system (rather than relying on a local WiFi Hotspot) and facilitate the use of Apple's Push Notification Service (APNS).

This would facilitate automated emergency contact to fleet operation rooms, live real time tracking of device/phone location to integrate into other systems (such as tachograph), alerts pushed to iOS devices via APNS when the phone is locked or the App is running in the background (currently only android will receive alerts/alarms under these circumstances, iOS will not do this unless via APNS)

To facilitate improved WiFi Hotspot connectivity between phone (in cab) and device (in trailer) both of which are metal boxes (not ideal for WiFi) external antennae may potentially be used.

The smartphone app provides a number of user-selectable functions, such as:

(A) Camera Capture—Click and after 10 seconds the sensor device camera will take a single picture which will display for a set period of time that can be adjusted in settings (default 5 seconds). The picture will be stored to be used as evidence of a check.

(B) Camera Live—Click and after 10 seconds there will be a live camera stream from the sensor device to the phone. The live stream will display for a set period of time that can be adjusted in settings (default 20 seconds).

(C) $CO_2$ Detector—Slide button to enable the $CO_2$, temperature and humidity detector. Once enabled the $CO_2$ detector will take readings every 30 secs for the first 3 minutes and then after 3 minutes at the time interval set in settings (default 6 mins). If the alarm is triggered it will give an audible alarm (beep) and take a picture. The alarm trigger threshold can be set for an upper and lower limit in settings depending on cargo (default Upper 600 ppm and Lower 400 ppm). The driver should fit the device in the trailer, complete loading, secure the trailer and then after 5 mins check the $CO_2$ level and use this as the baseline $CO_2$ reading (normally around 500 ppm). Once the baseline is established the alarm limits should be set to be 100 ppm above and below. It typically takes 5 mins for one person inside the trailer to raise the $CO_2$ by 100 ppm (D) Motion (PIR) Detector—Slide to enable and the PIR will detect movement and if the alarm is triggered give a visual (flashes red) and audible (beep) alarm and take a picture. The alarm trigger threshold can be adjusted in settings depending on vehicle type and cargo (default update interval 100 ms) and higher sensitivity is 1 and lower sensitivity is 10. Within device PIR settings, the update interval can be set to adjust how often the detector checks for motion. The sensitivity can be set to adjust how many times motion has to be detected before the alarm is triggered. If remote PIRs are added to the device (max of 8) then these will also independently trigger the alarm.

(E) Trips & Images—When an alarm is triggered or if the camera capture is used the image is stored for use as evidence of a check and record of alarms being triggered. Images can be filtered by date. The images are labelled with the alarm type (PIR, $CO_2$ or Camera), date and time. Once an image has been stored it can be uploaded to a specific "Trip Log" from the app as evidence that the device has been used to conduct an internal check of the trailer using an upload button The driver selects the image to upload, enters their driver ID and password and then selects the relevant "trip log" to upload the image to.

(F) Device List View—The App can control multiple devices and the selected device will be controlled by the settings and sensor buttons but other connected devices will still register alarms to the phone.

(G) Live/Lost Device—The current (Live) device is shown at the top of the screen with its battery status. If the device is in standby this box is grey. If the battery fails or the device is out of range or faulty the app registers (lost) device and triggers an alarm.

(H) Alarm On/Off—With Alarm Off, the App will register a "beep" and take a picture when an alarm is triggered if the App is active. With Alarm On the App will use the phone Alarm system and register the "Alarm Tone" selected in settings when the phone is locked or the App is open in the background. The Alarm On might be used if the driver is sleeping in the cab and wants to be alerted if there is a problem. The volume of the Alarm is controlled by the phone's internal Alarm/Notification settings.

(I) Power On/Off—the Device can be placed in standby mode remotely with power off. The device is still connected and using battery power but none of the sensors are active. Standby mode should be used as often as possible to save battery power. A fully charged battery (8.5$v$) will last for 48 hrs in (Live) mode and continuous use. Using standby mode this can be increased to 96 hrs. The battery indicator will turn Amber and then Red as the battery runs down and will send a "Low Battery" alarm when it needs replacing (7$v$). The device will shut down below 6.5 v.

(J) Add Device—is used to add additional devices to the App. The procedure is the same as the first device and once added can be selected from the list view. This can be used when two DBD Devices are fitted to tandem trailers.

The invention claimed is:

1. A road freight transport security system for a vehicle, comprising:
   a database;
   a portable electronic device running a security application, the security application being configured to prompt a user to carry out a plurality of external security checks of the vehicle, provide a facility for the user to confirm completion of those checks, provide a facility for the user to associate one or more photographs, taken by the portable electronic device, with one or more of the checks, and to upload log data to the database, the log data indicating at least a date, time and location of completion of the checks; and
   a sensor device, mounted within a freight area of the vehicle, having, or being in communication with, one or more sensors within the freight area of the vehicle, the one or more sensors comprising one or more of a motion sensor, a CO2 sensor, a temperature sensor, and a humidity detector, each for detecting an anomaly indicative of unauthorized entry of and presence inside the freight area of the vehicle by one or more persons, and being operable to communicate, when the sensor device is in an active mode during a stop in a journey by the vehicle, and not when the sensor device is in a dormant mode while the vehicle is being driven, an alert to the portable electronic device in the event that the anomaly is detected inside the freight area.

2. The road freight transport security system according to claim 1, comprising one or more tamper proof seals for sealing the freight area of the vehicle, the tamper proof seal bearing a unique identification code, the unique identification code having embedded therein an encrypted unique code to prevent the tamper proof seal from being replicated,
   wherein the security application is configured to provide a facility for the user to scan the unique identification code as an external security check and/or for customs purposes.

3. The road freight transport security system according to claim 2, wherein the tamper proof seal comprises a pre-tensioned steel wire rope, which if cut will fray.

4. The road freight transport security system according to claim 1, wherein the log data cannot be modified once generated.

5. The road freight transport security system according to claim 1, wherein the security application is configured to electronically record, in association with each confirmed check and/or photograph, the location, the date and the time.

6. The road freight transport security system according to claim 1, wherein the security application is configured to electronically record an identity of the user and/or an identity of the vehicle.

7. The road freight transport security system according to claim 1, wherein the sensor device comprises a camera, and is responsive to the detection of the anomaly to capture an image of the interior of the freight area.

8. The road freight transport security system according to claim 1, wherein when in the dormant mode the sensors will be powered down.

9. The road freight transport security system according to claim 8, wherein the security application permits the user to switch the sensor device between the active mode and the dormant mode.

10. The road freight transport security system according to claim 1, wherein the sensor device comprises a magnetic mount for removably fixing the sensor device at any desired location within the freight area.

11. The road freight transport security system according to claim 1 wherein the user can automatically contact the appropriate security authorities based on their GPS location.

12. The road freight transport security system according to claim 1, wherein a single portable electronic device is configured to control and receive alerts from multiple sensor devices, and wherein the control and alert receiving function is handed over to a different portable electronic device without having to enter the freight area of the vehicle.

13. A portable electronic device running a security application for a road freight transport security system for a vehicle, the portable electronic device providing access to a remote database, and being configured to receive alerts from a remote sensor device mounted within a freight area of the vehicle in the event that an anomaly is detected inside the freight area, the remote sensor device comprising one or more of a motion sensor, a CO2 sensor, a temperature sensor, and a humidity detector, each for detecting an anomaly indicative of unauthorized entry of and presence inside the freight area of the vehicle by one or more persons,
   wherein said alerts are received when the remote sensor device is in an active mode during a stop in a journey by the vehicle, and not when the remote sensor device is in a dormant mode while the vehicle is being driven, and
   wherein the security application is configured to prompt a user to carry out a plurality of external security checks of the vehicle, provide a facility for the user to confirm completion of those checks, provide a facility for the user to associate one or more photographs, taken by the portable electronic device, with one or more of the checks, and to upload log data to the database, the log data indicating at least a date, time and location of completion of the checks.

14. A remote sensor device, for mounting within a freight area of a vehicle, having, or being in communication with, one or more sensors, and being operable to communicate an alert to a portable electronic device in the event that an anomaly is detected inside the freight area, the portable electronic device running a security application for a road freight transport security system for the vehicle, the portable electronic device providing access to a remote database, and being configured to receive alerts from the remote sensor device in the event that the anomaly is detected inside the freight area, the remote sensor device comprising one or more of a motion sensor, a CO2 sensor, a temperature sensor, and a humidity detector, each for detecting an anomaly indicative of unauthorized entry of and presence inside the freight area of the vehicle by one or more persons,
   wherein said alerts are received when the remote sensor device is in an active mode during a stop in a journey by the vehicle, and not when the remote sensor device is in a dormant mode while the vehicle is being driven, and
   wherein the security application is configured to prompt a user to carry out a plurality of external security checks of the vehicle, provide a facility for the user to confirm completion of those checks, provide a facility for the user to associate one or more photographs, taken by the portable electronic device, with one or more of the checks, and to upload log data to the database, the log data indicating at least a date, time and location of completion of the checks.

* * * * *